United States Patent
Qian et al.

(10) Patent No.: US 9,946,800 B2
(45) Date of Patent: Apr. 17, 2018

(54) RANKING RELATED OBJECTS USING BLINK MODEL BASED RELATION STRENGTH DETERMINATIONS

(71) Applicant: International Business Machines Corporation, Armonk, NY (US)

(72) Inventors: Haifeng Qian, Mount Kisco, NY (US); Hui Wan, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 324 days.

(21) Appl. No.: 14/791,789

(22) Filed: Jul. 6, 2015

(65) Prior Publication Data

US 2017/0011037 A1    Jan. 12, 2017

(51) Int. Cl.
*G06F 17/30* (2006.01)
*G06Q 50/00* (2012.01)

(52) U.S. Cl.
CPC .. *G06F 17/30867* (2013.01); *G06F 17/30958* (2013.01); *G06Q 50/01* (2013.01)

(58) Field of Classification Search
CPC .......... G06F 17/3053; G06F 17/30864; G06F 17/30867; G06F 17/30958; G06F 17/30961; G06Q 50/01
USPC ....... 707/603, 748, 758, 765, 766, 797, 798; 706/12, 16, 21, 52; 345/440
See application file for complete search history.

(56) References Cited

U.S. PATENT DOCUMENTS

| | | | |
|---|---|---|---|
| 6,285,999 B1 | 9/2001 | Page | |
| 6,799,176 B1 | 9/2004 | Page | |
| 7,617,194 B2 | 11/2009 | Liu et al. | |
| 8,024,324 B2 | 9/2011 | Amitay et al. | |
| 8,312,049 B2 * | 11/2012 | Chayes | G06F 17/3071 707/793 |
| 2,676,162 A1 | 1/2014 | Kawai et al. | |
| 8,681,155 B2 | 3/2014 | Basak | |
| 8,725,726 B1 | 5/2014 | Page | |
| 8,825,645 B1 | 9/2014 | Bharat et al. | |
| 8,838,611 B2 | 9/2014 | Kim et al. | |
| 8,843,479 B1 | 9/2014 | Bharat et al. | |

(Continued)

OTHER PUBLICATIONS

"The PageRank Citation Ranking: Bringing Order to the Web", Technical Report, Stanford University, Jan. 29, 1998, 17 pages.

(Continued)

*Primary Examiner* — Greta L Robinson
(74) *Attorney, Agent, or Firm* — Stephen J. Walker, Jr.; William J. Stock

(57) ABSTRACT

Mechanisms are provided for performing a cognitive operation. An input graph is received having a plurality of first nodes, where subsets of first nodes are coupled to one another via first edges and each first edge has an associated weight. A blinking graph model is generated based on the graph, where blink rates are associated with second edges and are calculated based on weights of corresponding first edges in the input graph. The blink rate specifies a fraction of time a corresponding second edge is determined to be present in the blinking graph model. A relatedness metric is calculated for a target node relative to a node of interest based on the blink rates of the second edges. The relatedness metric indicates a degree of relatedness of the target node to the node of interest. A cognitive operation is then performed based on the relatedness metric.

18 Claims, 8 Drawing Sheets

(56) References Cited

U.S. PATENT DOCUMENTS

| | | | |
|---|---|---|---|
| 8,938,412 B2* | 1/2015 | Bradley | G06N 5/02 706/52 |
| 2005/0198559 A1 | 9/2005 | Fujiwara | |
| 2009/0287678 A1 | 11/2009 | Brown et al. | |
| 2009/0327271 A1 | 12/2009 | Amitay et al. | |
| 2011/0066587 A1 | 3/2011 | Ferrucci et al. | |
| 2011/0125734 A1 | 5/2011 | Duboue et al. | |
| 2011/0282855 A1 | 11/2011 | Ronen et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0254305 A1* | 9/2013 | Cheng | H04L 51/32 709/206 |
| 2013/0262501 A1* | 10/2013 | Kuchmann-Beauger | G06F 17/30958 707/769 |
| 2014/0214945 A1* | 7/2014 | Zhang | H04L 67/306 709/204 |
| 2014/0237037 A1* | 8/2014 | Waingold | H04L 67/22 709/204 |
| 2015/0026112 A1* | 1/2015 | Alboszta | G06N 7/005 706/46 |

OTHER PUBLICATIONS

Adamic, Lada A. et al., "Friends and Neighbors on the Web", Social Networks 25, 2003, pp. 211-230.

Ball, M.O. et al., "Network Reliability", Technical Research Report, TR 92-74, University of Maryland, Jun. 23, 1992, 101 pages.

Fratta, Luigi et al., "A Boolean Algebra Method for Computing the Terminal Reliability in a Communication Network", IEEE Transactions on Circuit Theory, vol. CT-20, No. 3, May 1973, pp. 203-211.

Haveliwala, Taher et al., "An Analytical Comparison of Approaches to Personalizing PageRank", Technical Report, Stanford University, 2003, 4 pages.

High, Rob, "The Era of Cognitive Systems: An Inside Look at IBM Watson and How it Works", IBM Corporation, Redbooks, Dec. 12, 2012, 16 pages.

Jeh, Glen et al., "SimRank: A Measure of Structural-Context Similarity", The Eighth ACM SIGKDD International Conference on Knowledge Discovery and Data Mining, Jul. 23 - 25, 2002, 11 pages.

Katz, Leo, "A New Status Index Derived from Sociometric Analysis", Psychometrika—vol. 18, No. 1, Mar. 1953, pp. 39-43.

Liben-Nowell, David et al., "The Link-Prediction Problem for Social Networks", Journal of the American Society for Information Science and Technology, 58(7): 1019-1031, 2007, 13 pages.

McCord, M.C. et al., "Deep parsing in Watson", IBM J. Res. & Dev. vol. 56 No. 3/4 Paper 3, May/Jul. 2012, pp. 3:1-3:15.

Wan, Hui et al., "Belief Logic Programming: Uncertainty Reasoning with Correlation of Evidence", Logic Programming and Non-monotonic Reasoning 2009 Lecture Notes in Computer Science, 2009, 13 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

RANKING RELATED OBJECTS USING BLINK MODEL BASED RELATION STRENGTH DETERMINATIONS

BACKGROUND

The present application relates generally to an improved data processing apparatus and method and more specifically to mechanisms for ranking related objects using blink model based relation strength determinations.

Many real-world applications involve determining relations between two or more objects. These applications utilize metrics for evaluating the "relatedness" of one object to one or more other objects. These metrics are sometimes referred to as relation-strength metrics, distance metrics, similarity metrics, ranking scores, or the like. Examples of such applications include search engine recommendations which recommend web pages that are related to a web page being viewed by a user based on the inter-linking graph between web pages. Other examples include social media websites that provide recommendations of contacts of individuals, e.g., recommending potential new contacts to a user based on an existing social network graph. Still further examples include web sites that recommend multi-media content based on recently viewed multi-media content and commonality of attributes among the multi-media content expressed in a graph. In yet another example, web sites that recommend products based on the item being viewed by a user and similarity between products. Many other examples may be provided in which the application is determining relationships between objects for purposes of performing a processing operation and generating an output.

There are many solutions used by such applications for determining the metrics indicative of relatedness. Examples of these solutions include the PageRank algorithm, SimRank algorithm, Adamic/Aday, and Katz algorithms. The drawback of these solutions is that they have relatively low accuracy. For example, in Liben-Nowell and Kleinberg, "The Link-Prediction Problem for Social Networks," Journal of the American Society of Information Science and Technology, 2007 it was demonstrated that, for link prediction for co-authorship social networks, the best accuracy that was able to be achieved was only 16% accuracy.

SUMMARY

In one illustrative embodiment, a method, in a data processing system comprising a processor and a memory, for performing a cognitive operation is provided. The method comprises receiving, by the data processing system, an input graph comprising a plurality of first nodes, where subsets of first nodes in the plurality of first nodes are coupled to one another via one or more first edges and each first edge in the one or more first edges has an associated weight value. In addition, the method comprises generating, by the data processing system, a blinking graph model based on the graph. The blinking graph model comprises blink rate values associated with second edges of the blinking graph model calculated based on weights of corresponding first edges in the input graph. The blink rate value specifies a fraction of time a corresponding second edge is determined to be present in the blinking graph model. The method also comprises calculating, by the data processing system, a relatedness metric for a target node in the blinking graph model relative to a node of interest based on the blink rate values of the second edges. The relatedness metric indicates a degree of relatedness of the target node to the node of interest. Furthermore, the method comprises performing, by the data processing system, a cognitive operation based on the relatedness metric.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
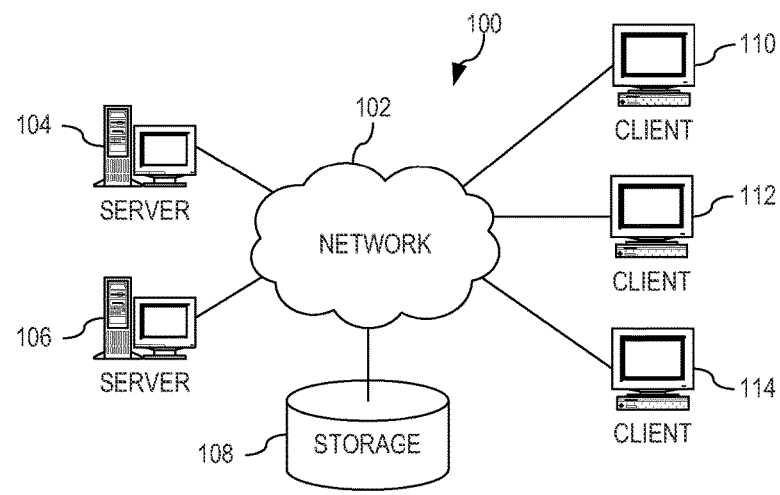
FIG. 1 is an example diagram of a distributed data processing system in which aspects of the illustrative embodiments may be implemented.

The illustrative embodiments provide mechanisms for ranking related objects using blink model based relation strength determinations. The rankings of the related objects may then be utilized to by a cognitive system to perform one or more cognitive operations. A cognitive operation, in the context of the present description, is a computer-implemented operation that performs a function based on relatedness between objects in a graph data structure. The cognitive operation approximates a human thought process as well as enables people and machines to interact in a more natural manner so as to extend and magnify human expertise and cognition. A cognitive system comprises artificial intelligence logic, such as natural language processing (NLP) based logic, for example, and machine learning logic which may be provided as specialized hardware, software executed on hardware, or any combination of specialized hardware and software executed on hardware. The logic of the cognitive system implements the cognitive operation(s). Examples of such cognitive operations which may be implemented by corresponding cognitive systems include, but are not limited to, question answering, identification of related concepts within different portions of content in a corpus, intelligent search algorithms, such as Internet web page searches, for example, and recommendation generation, e.g., items of interest to a particular user, potential new contact recommendations, or the like.

As mentioned above, the basis of the cognitive operation(s), in accordance with the illustrative embodiments, is a ranking of related objects obtained using a blink model based relation strength determination, which is also referred to herein as a relatedness metric. The illustrative embodiments provide a mechanism for defining the relatedness metric, and mechanisms for computing the relatedness metric given a directed graph of nodes, where the nodes represent the objects, persons, concepts, documents, or any other entity for which a relatedness determination is to be made and edges between the nodes represent relationships, or potential relationships, between the nodes. The graph may be a directed hyper graph allowing multi-source multi-sink hyper edges between nodes of the graph, may be an undirected graph in which edges are assumed to provide connectivity from and to each of the nodes connected by the edges, or the like. The graph itself may be generated in many different known or later developed ways. It is assumed for purposes of the present description that the graph is provided as input to the mechanisms of the illustrative embodiments.

Also provided as input, the edges connecting nodes in the graph are assigned numeric weight values, such as a numeric weight value between 0 and 1 or other implementation specific determined numeric weight range, where a higher edge weight indicates that the relationship represented by the corresponding is based on stronger evidence. The numeric weights themselves may be determined in many different ways including various analysis of evidence sources, e.g., electronic knowledge or information sources representing general knowledge, domain specific documents, news articles, attributes of the objects themselves, or any other source of information indicative of relatedness between objects, to identify evidence of relatedness between two or more objects. In some cases, in order to model correlation among multiple evidences, the numeric weight values of multiple edges may be specified by a joint function, such as a joint belief function, e.g. in one illustrative embodiment this may be performed using a joint belief function such as described in Wan et al., "Belief Logic Programming: Uncertainty Reasoning with Correlation of Evidence," Logic Programming and Non-monotonic Reasoning 2009 Lecture Notes in Computer Science, pp. 316-328, 2009, which is hereby incorporated by reference. It should be noted that in the joint belief function of Wan et al., the input graph must be acyclic and is not a blinking graph model, as in the presently described invention as discussed hereafter.

The numeric weight, or a function thereof, is used in a blinking graph model to indicate the fraction of time the corresponding edge is actually present in the graph, and thus, the objects are connected or related to one another, while the remainder of the time the corresponding edge is not present in the graph. In this way, the edges in the graph "blink" according to their weights. For edge weights that are specified individually, edges blink independently. For a set of edge weights specified by a joint function, this function specifies the fractions of time that each subset of these edges exist in the blinking graph. In one illustrative embodiment, a relation-strength metric from node A to node B is defined by the value b(A,B) which is the fraction of time that a path exists from node A to node B in the blinking graph.

This blinking graph model may be utilized to find strengths of relationships from a node of interest to all other nodes in the graph. The resulting strengths of relationships may then be used directly or be post-processed to perform a knowledge based operation to achieve a desired functionality, e.g., providing recommendations to users, generating desired outputs, redirecting web browsers to related web sites, presenting advertising, identifying potentially related individuals, or a plethora of other functionalities that are based on a determined degree of relatedness of two or more objects, persons, concepts, documents, or any other entity that is able to be modeled as a node in a directed or undirected graph.

The value range of b(A,B) is narrow to human perception so a more convenient strength of relationship function may be defined as follows $$s(A,B)=-\log(1-b(A,B)) \qquad (1)$$

This strength of relationship metric has a number of valuable properties that are consistent with human judgment:

1. s(A,B) is additive when two independent (i.e. sharing only two common nodes A and B) input sub-graphs are combined.
2. s(A,B) is non-decreasing when a new edge is added or when an edge weight increases anywhere in the graph.
3. s(A,B) is non-increasing when an edge is deleted or when an edge weight decreases anywhere in the graph.
4. s(A,B) is stable when remote changes happen in the graph.

The above describes an embodiment where a metric is defined based on the event "a path exists from node A to node B" in the blinking graph. Similar metrics are naturally extendable to other events in the blinking graph. For example, in another illustrative embodiment, the strength of the relationship from node set $S_A$ to node B may be defined as $b(S_A, B)$ being the fraction of time that a path exists from at least one node in the node set $S_A$ to node B in the blinking graph. In yet another illustrative embodiment, the strength of the relationship from node set $S_A$ to node B as may be defined as $b(S_A, B)$ being the fraction of time that a path exists from each node in the node set $S_A$ to node B in the blinking graph. It should be noted that the above two definitions are different and will result in different score values and different ranking of objects such that different applications may benefit from a different choice of the definitions.

Similarly, in yet another illustrative embodiment, strength of relationship from node set $S_A$ to node set $S_B$ may be defined as $b(S_A, S_B)$ being the fraction of time that a path exists from at least one node in node set $S_A$ to at least one node in node set $S_B$ in the blinking graph. The list of possibilities goes on all possible definitions of the strength of relationship based on the fraction of time edges exist in the blinking graph between two or more nodes is intended to be within the spirit and scope of the illustrative embodiments. For each of these definitions, the corresponding s( ) functions may be defined by the relation:

$$s(\ldots) = -\log(1 - b(\ldots)) \quad (2)$$

Although the blink model offers many possible metrics with which to rank objects, the following description will focus on the node to node metric b(A,B) for purposes of illustration. However, the selection of this metric is not to be construed as limiting on the present invention but is selected only for ease of description. Those of ordinary skill in the art will appreciate that following description may be extended to any of the possible definitions set forth above or otherwise apparent to those of ordinary skill in the art in view of the present description.

One way to evaluate b(A,B), and hence s(A,B), is by direct and exact calculation. To do so, all sub-graphs of the input graph are enumerated. It should be noted that each sub-graph is a possible state of the blinking graph where some edges are present while others are missing. For each sub-graph, the sub-graph's fraction of time of existence is computed as follows:

$$t_{subgraph\ i} = \prod_{edge\ e\ in\ subgraph\ i} b_e \cdot \prod_{edge\ e\ not\ in\ subgraph\ i} (1 - b_e) \quad (3)$$

The above formula is used when all edge weights are specified individually. When joint edge weight functions exist for certain edge groups, the computation is similar but slightly more complex. Then, the sub-graphs that satisfy the event of interest are summed, where the "event of interest" is the relationship between node A and node B in this example:

$$b(A, B) = \sum_{a\ path\ exists\ from\ A\ to\ B\ in\ subgraph\ i} t_{subgraph\ i} \quad (4)$$

In a graph with M edges, there are $2^M$ sub-graphs, and the complexity of the above computation is at least $O(2^M)$. With modern computing technology, this is prohibitive for M above 50, and therefore impractical for most applications where M is often millions or more. Careful arrangement of the enumeration process can avoid explicitly enumerating certain sub-graphs and thereby save some amount of computation, but the overall complexity will still be exponential with respect to graph size, and impractical for most applications.

One way to approximately evaluate b(A,B), and hence s(A,B), is by using a Monte Carlo algorithm, i.e., random sampling. To do so, one creates a pseudo random process which produces a sub-graph of the input graph, such that the outcome is sub-graph i with theoretical probability $t_{subgraph\ i}$, given by the same formula (3) in the previous paragraph. K number of samples are taken noting that each sample is a sub-graph. Then b(A,B) is estimated to be:

$$b(A, B) \approx \frac{\sum_{j=1}^{K} \delta_j}{K}, \quad (5)$$

$$\text{where } \delta_j = \begin{cases} 1, & \text{if a path exists from } A \text{ to } B \text{ in sample } j \\ 0, & \text{otherwise} \end{cases}$$

The computational complexity of the above is O(MK). The drawback of this method is that K is large in order to reach sufficient accuracy to discern different objects, particularly when b(A,B) values are close to 0 or close to 1 in an application. Careful arrangement of the sampling process (for example, in a breadth-first search ordering from node A) can avoid explicitly sampling certain subgraphs and thereby save some amount of computation, but the overall complexity will still be O(MK). Biased-sampling techniques, such as importance sampling, offers little help, because in most applications multiple b(A,B) values are being computed and a biasing scheme that helps $b(A,B_1)$ to converge may degrade $b(A,B_2)$. With K often being in the millions or even higher to discern different objects, Monte Carlo methods offer undesirable accuracy-runtime tradeoffs and undesirable throughput and/or latency in most applications, and therefore may only be practical in limited scenarios.

To address this complexity, the illustrative embodiments provide an approximation mechanism to compute the relatedness metric approximately within practical time and storage space complexities. The illustrative embodiments assume that each edge represents independent evidence of relatedness and thus, blinks independently. The approximation mechanism of the illustrative embodiments approximates the relatedness metric by separating the types of paths between nodes into a first set of paths comprising 1-step and 2-step paths, and a second set of paths which are paths that comprise greater than 2-steps. For clarity, assume that there is a series of nodes A, B, C, and D with A linked to B, B linked to C, and C linked to D. With regard to node A, node B is 1-step away from node A, node C is 2-steps away from node A, and node D is 3-steps away from node A, i.e. each link, or edge connecting nodes, is a step. In this situation, the path from node A to each of nodes B and C would be separated into the first set of paths since these are 1-step and 2-step paths, while the path between node A and node D would be separated into the second set of paths, since it is a 3-step path, such that it will be processed differently. Thereafter, the contribution of each set of paths to the overall relatedness metric is computed.

For paths in the first set of paths, i.e. 1-step and 2-step paths, since there is no possibility of links or edges being shared among 1-step and 2-step paths, their contributions to the relatedness metric s( . . . ) are additive. However, contributions from paths with lengths greater than 2, i.e.

3-step paths or greater, are no longer additive because they may share edges among themselves and with other 2-step paths. As a result, a discount amount is determined based on the degree of edge-sharing among paths.

The calculation of the contribution of the paths that have greater than 2 length comprises collecting a set of no-loop paths starting from the node of interest such that all no-loop paths within a certain degree of plausibility are identified, where each no-loop path is either a complete path or a partial path. The no-loop paths or partial paths with length more than 2 are then grouped according to a same end node. Within each group, the paths or partial paths are then overlapped such that usages of each edge are calculated.

Thereafter, each length-more-than-2 path is analyzed to estimate its individual contribution to the relatedness metric between the node of interest and the end node for that group. In order to do this, for each path, a representative usage value for the path is computed based on the usage values of individual edges that make up the particular path. This representative usage is a value representative of the degree of sharing of edges along the path from the node of interest to the end node for the group. A hypothetical sub-graph is then constructed to replace the path from the node of interest to the end node, where the sub-graph has nodes and edges with new edge weight values that are estimated as a function of the original edge weights in the path, the representative usage value for the path and the individual usages of each edge in the path. A contribution of the hypothetical sub-graph to the relatedness metric for the path from the node of interest to the end node for the group is then calculated using an exact calculation, for example by enumeration of blinking states as described earlier.

Next, a sub-graph of the hypothetical sub-graph is generated that comprises only length-2 paths. The contribution of the sub-graph of the hypothetical sub-graph to the overall relatedness metric for the group is then computed using exact calculations. This represents the amount that is already counted in 1-step and 2-step paths, and therefore that is to be subtracted from—the contribution of the hypothetical sub-graph to the relatedness metric for the path from the node of interest to the end node for the group. Thereafter, the contribution of the original path from the node of interest to the end node is calculated based on a function of the relatedness metric contribution of the hypothetical sub-graph, discounted by the contribution of the sub-graph of the hypothetical sub-graph, and then diluted by the representative usage.

This process may be repeated for each length-more-than-2 path from the node of interest to the end node of the particular group with the resulting relatedness metric being incremented with the resulting values. Once all of the length-more-than-2 paths are processed in this manner, the resulting relatedness metric provides an accurate approximation of the relatedness metric for the edge between the node of interest and the end node of that particular group.

Optionally, an outer loop can be added to iteratively refine the above calculation per group. That is, after the individual contributions of all length-more-than-2 paths are calculated, these individual contribution values may be used as path-weight values and thereby update the usages of each edge in the original graph. Then each length-more-than-2 path may be re-analyzed as described above. A small number of iterations is sufficient to further improve accuracy.

This process is then repeated for each group such that a plurality of relatedness metrics may be generated, one from the node of interest to each other node, or a sub-set of the other nodes, in the original graph, e.g., the original directed/undirected hyper graph.

It should be appreciated that the details by which to calculate the contributions of the paths to the relatedness metric may take many different forms depending upon the particular implementation. However, the underlying methodology is the same in each implementation. That is, a hypothetical sub-graph is constructed that models the path of interest. A representative amount of sharing of edges along the path is generated. The difference in relatedness metrics of the hypothetical sub-graph versus what has already been counted in the 1-step and 2-step path calculation is calculated (i.e. the discounted amount), and the resulting contribution to the overall relatedness value for the path is diluted by the representative amount of sharing, i.e. the representative usage.

Before beginning the discussion of the various aspects of the illustrative embodiments in greater detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
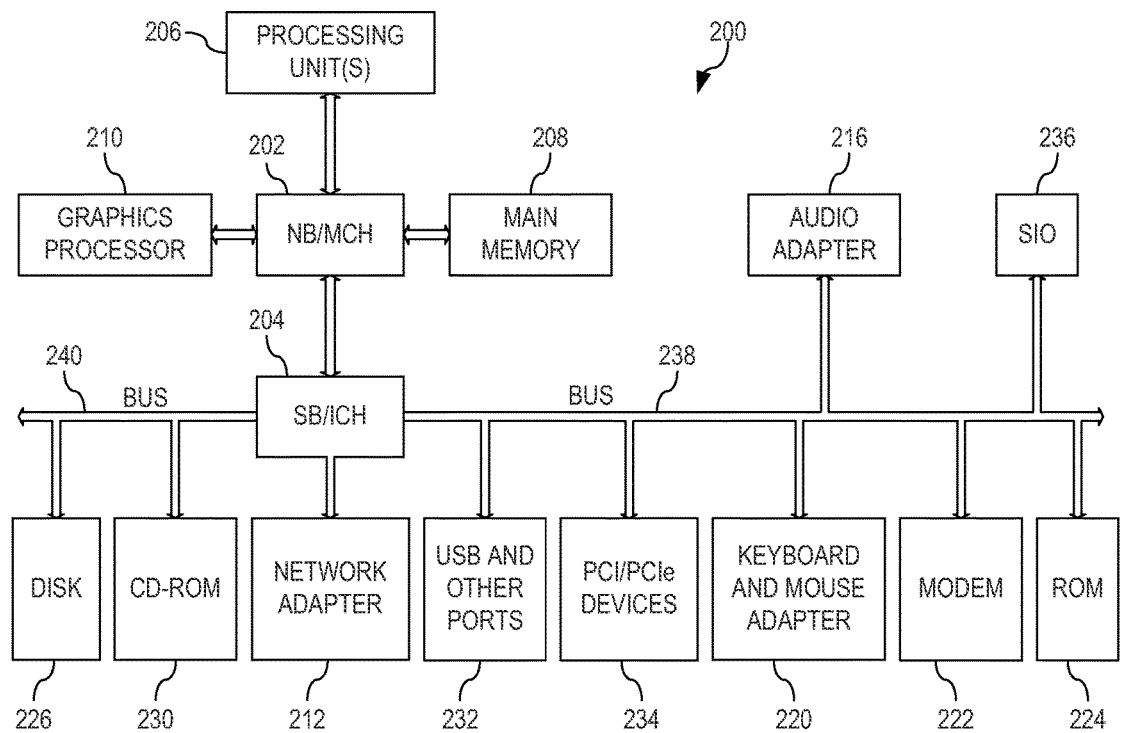
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As mentioned above, the illustrative embodiments, which may be implemented in dedicated hardware, software executing on general purpose or specialized hardware, or any combination of executed software and hardware, in one or more of the data processing systems and computing devices shown in FIGS. 1-2, is directed to providing mechanisms for ranking related objects using blink model based relation strength determinations. With regard to the term "objects", what is meant is any entity for which relationships with other entities of the same or different types may be identified. Such entities may be entities existing in a physical manner or a virtual manner. For example, physical entities may be physical persons, physical items, physical places, physical conditions, physical documents, or the like. Virtual entities may be concepts, ideas, virtual avatars of physical persons, virtual documents existing as data, data structures, or the like. Essentially, the "objects" may be any entity that is definable by one or more attributes which may be used by itself or with other evidence information, to associate the object with one or more other objects of the same or different type.

For purposes of the following description, it will assumed that the "objects" are electronic documents or portions of electronic content, such as may be provided in a corpus of information used by a cognitive system to perform cognitive operations, such as to answer natural language questions, perform intelligent searches of the corpus and return results based on search requests, generate recommendations for a user, or the like. In some illustrative embodiments, as will be the assumed illustrative embodiment described herein for purposes of illustration, the mechanisms of the illustrative embodiments are used to rank electronic documents (which are the "objects") for purposes of performing cognitive operations. However, it should be appreciated that in other illustrative embodiments, the mechanisms described herein may be applied to other objects that may be of different types and may represent different entities as discussed above.

These "objects" may be represented as nodes in a graph where each node has attributes of the object that describe the object, e.g., for a person object a node may have attributes of name, address, age, place of employment, etc. The illustrative embodiments provide a mechanism for defining a relatedness metric, and mechanisms for computing this relatedness metric, given a directed/undirected graph of such nodes representing these objects, where the graph comprises one or more edges between nodes with the edges representing relationships, or potential relationships, between the particular nodes connected by the edges. The graph is utilized as a basis of a blink model where the "blinking" is represented by the weights assigned to the various edges of the graph such that the weights define the probability that the edge is present or not between the nodes. The relatedness metric is computed by approximating the strength of relationships between nodes according to the blink model based on paths between nodes, the number of uses of the edges, amount of reuse of the edges, and other factors to generate an approximation of the relatedness between the two nodes in the graph.

Figure 3:
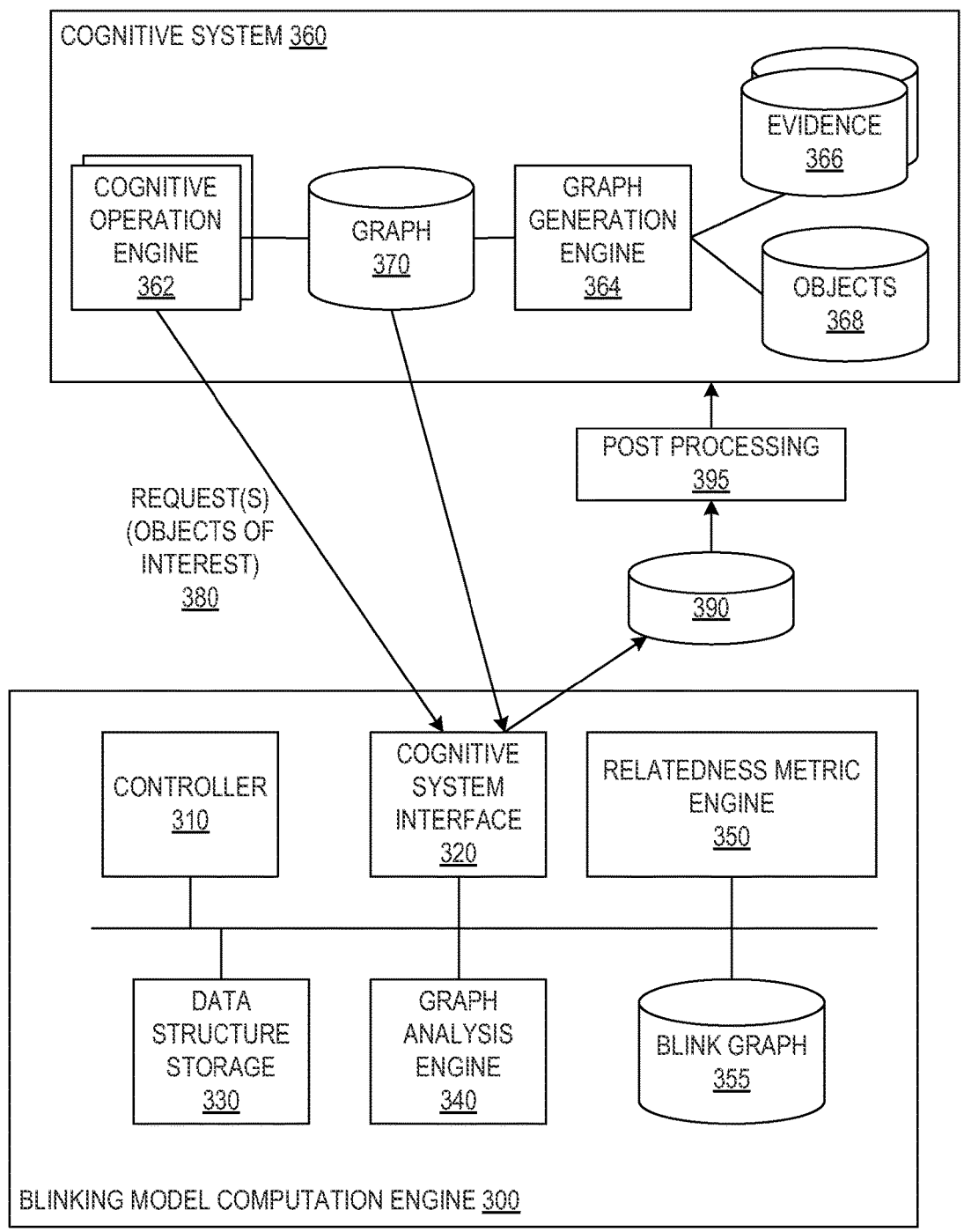
FIG. 3 is an example block diagram of the primary operational components of a blink model computation engine in accordance with one illustrative embodiment.

FIG. 3 is an example block diagram of the primary operational components of a blink model computation engine 300 in accordance with one illustrative embodiment. As shown in FIG. 3, the primary operational components of the blink model computation engine 300 comprise a controller 310, a cognitive system interface 320, a data structure storage 330, a graph analysis engine 340, and relatedness metric calculation engine 350. The cognitive system 360 is a system with which the blink model computation engine 300 operates in response to requests from the cognitive system 360. The cognitive system 360 comprises one or more cognitive operation engines 362, an graph data structure 370 which is generated based on the graph generation engine 364 based on evidence 366 and object data structures 368, as described in greater detail hereafter. It should be appreciated that the operational components shown in FIG. 3 may be implemented in software executed on hardware, dedicated hardware, or any combination of software executed on hardware and dedicated hardware. For purposes of the following description, it will be assumed that the operational components are implemented as software executing on hardware of one or more data processing systems.

In the depicted example, it is assumed that the cognitive system 360 is implemented on a different set of one or more data processing systems than that of the blink model computation engine 300. However, in some illustrative embodiments, the blink model computation engine 300 may be integrated in, or otherwise implemented in, the same set of one or more data processing systems as the cognitive system 360. For example, the blink model computation engine 300 may be implemented as part of the graph generation engine 364 of the cognitive system 360.

As mentioned above, the cognitive system 360 is a specialized computer system, or set of computer systems, configured with hardware and/or software logic (in combination with hardware logic upon which the software executes) to emulate human cognitive functions. The cognitive system 360 applies human-like characteristics to conveying and manipulating ideas which, when combined with the inherent strengths of digital computing, can solve problems with high accuracy and resilience on a large scale. As mentioned above, the cognitive system 360 implements logic, e.g., artificial intelligence logic and machine learning logic, for performing one or more cognitive operations, such as via the cognitive operation engines 362, where these cognitive operations are computer-implemented operations that perform a function based on a determined relatedness between objects in a graph data structure.

The cognitive system 360 may take many different forms and may implement various cognitive operations depending upon the particular implementation. For example, the cognitive system 360 may be an intelligent search engine that searches for particular information in a large store, or corpus, of information. The cognitive system 360 may be a system identifying relationships between human beings, or human beings and items of interest, to recommend contact between particular human beings. The cognitive system 360 may be a security, criminal investigation, terrorist identification, or other surveillance system that determines associations between persons, places, things, events, etc. for purposes of identifying potential threats or generating hypotheses regarding criminal/terrorist activity. The cognitive system 360 may implement logic to perform a medical diagnostic cognitive operation based on determined relatedness of diagnostic features of various illnesses and maladies as well as recommend treatments for the diagnosed illnesses and maladies. The cognitive system 360, among other possible cognitive systems such as search engine based systems, other natural language processing based systems, behavioral analysis systems, and the like, may be a question and answer (QA) system that answers natural language questions posed by users based on a corpus of information. In essence, the cognitive system 360 may be any system that performs a cognitive operation by drawing associations between objects based on evidence found from electronic evidence sources and attributes of the objects themselves.

The IBM Watson™ cognitive system is an example of one such cognitive system. The IBM Watson™ cognitive system, also referred to as the IBM Watson™ question and answer (QA) system, processes human readable language and identifies inferences between text passages with human-like high accuracy at speeds far faster than human beings and on a larger scale. In general, such a cognitive system is able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect of a QA cognitive system, such systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

In operation, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

It should be appreciated that a QA system, such as the IBM Watson™ QA system, is only one example of a cognitive system with which the mechanisms of the illustrative embodiments may be utilized. Other cognitive systems may include, for example, websites that attempt to identify potential associations between users, e.g., potential "friends" or business associations on the website. Examples of such websites that utilize such features include Facebook™ and LinkedIn™. Reference to specific cognitive systems, such as a QA system, is only for illustrative purposes and is not intended to be limiting on the claimed invention. To the contrary, the present invention may be utilized with any cognitive system in which a graph of objects and their potential relationships is utilized to perform a cognitive operation.

As shown in FIG. 3, in general the cognitive system 360 comprises one or more cognitive operation engines 362 which perform the cognitive operation specific to the particular cognitive system 360, e.g., answering a natural language question, identifying users that may be associated with one another and providing a recommendation output to the users that they become communicatively linked via the cognitive system, identifying documents that reference similar or related subject matter and presenting this information to a user, or any of a plethora of different types of cognitive operations. The cognitive operations performed by the cognitive operation engines 362 may operate based on a graph data structure 370 which comprises nodes and edges linking nodes, where the edges may be weighted based on importance or reliability of supporting evidence and similarity of attributes indicating that the association between the nodes connected by the edges is likely or not likely to exist. The cognitive operation engines 362 may process this graph in accordance with their logic to identify associations of nodes meeting the criteria of the cognitive operation engine 362 and thereby utilize this information to perform the cognitive operation.

The graph 370 may be generated by a graph generation engine 364 that generates the graph based on object data structures 368 and evidence data obtained from one or more evidence sources 366. That is, object data structures 368 may be utilized to define nodes in the graph 370 and attributes of the object data structures 368 may be utilized to identify edges between nodes. Moreover, evidence data obtained from evidence sources 366 may be utilized to identify relationships between nodes, i.e. edges, and/or evaluate the edges between nodes in order to generate weight values associated with these edges, e.g., if more evidence is present that there is a relationship between node A and node B, then the weight value of the edge may be increased, while if there is little evidence of the relationship being present, then the weight value of the edge may be relatively low.

With regard to a QA cognitive system, the evidence sources 366 and/or object data structures 368 may be a corpus of documents, for example, which may be ingested and evaluated to identify concepts, entities, or the like, in the documents and the relationships between such concepts, entities, or the like. With regard to a social networking website, for example, the object data structures 368 may be data structures defining users of the social networking website, e.g., user account information, while the evidence sources 366 may comprise textual messages exchanged via the social website, third-party sources of information such as organization registries, governmental/business directories, pubic government information sources, other social networking websites, or the like.

The graph 370 may be a directed hyper graph allowing multi-source multi-sink hyper edges between nodes of the graph 370, may be an undirected graph in which edges are assumed to provide connectivity from and to each of the nodes connected by the edges, or the like. The graph 370 itself may be generated in many different known or later developed ways by the graph generation engine 364.

The edges connecting nodes in the graph are assigned numeric weight values, such as a numeric weight value between 0 and 1 or any other desired range of weight values, by the graph generation engine 364, such as in response to evaluating evidential support for the edges between nodes as obtained from the attributes of the nodes themselves determined from the object data structures 368, e.g., similarities of attributes of a particular type between the nodes of the edge, where the type corresponds to the type of edge. The evidential support may further be obtained from the evidence sources 366 which may provide other data indicative of a relationship between the nodes of an edge. The numeric weights may be determined in many different ways including various analysis of evidence sources 366, e.g., electronic knowledge or information sources representing general knowledge, domain specific documents, news articles, attributes of the objects themselves, or any other source of information indicative of relatedness between objects, to identify evidence of relatedness between an object of interest and one or more other objects. As mentioned above, in some cases, in order to model correlation among multiple evidences, the weights of multiple edges may be specified by a joint function, such as a joint belief function, see one example as described in Wan et al., "Belief Logic Programming: Uncertainty Reasoning with Correlation of Evidence," Logic Programming and Non-monotonic Reasoning 2009 Lecture Notes in Computer Science, pp. 316-328, 2009, which has been incorporated by reference above.

The cognitive system 360 may operate in conjunction with the blink model computation engine 300, implementing the mechanisms of the illustrative embodiments that utilize a blink model, to perform a cognitive operation. The controller 310 of the blink model computation engine 300 performs operations for coordinating and orchestrating the operation of the other elements of the blink model computation engine 300 and performs any operations not ascribed to another element of the blink model computation engine 300. The data structure storage 330 provides a storage location for any data structures that the blink model computation engine 300 may need to store, temporarily or on a more permanent basis, to perform its functions in responding to requests from the cognitive system 360.

During initialization, the blink model computation engine 300 receives graph data structure 370 as input through cognitive system interface 320, which may then be stored in the data structure storage 330. During operations of the cognitive operation engine 362 of the cognitive system 360, the cognitive operation engine 362 issues query requests 380 to the blink model computation engine 300. Each query request contains one or more objects of interest. For example, a social network query request may specify a person, "Tom," of interest, and ask the blink model computation engine 300 to calculate Tom's relation strength with respect to all other persons in the social network graph, e.g., graph data structure 370, and to return the top 1000 persons with largest relation strength values. The blink model computation engine 300 receives such a query request through interface 320, and, via orchestration by the controller 310, performs calculation of the blink-model relatedness metric via the relatedness metric engine 350 exactly if possible and approximately if necessary. As mentioned previously, computational complexity is high to compute the blink-model relatedness metric exactly or to compute it approximately by random sampling. To address this complexity, the blink model computation engine 300 computes the relatedness metric approximately within practical time and storage space complexities in the manner previously described above.

The graph analysis engine 340 comprises logic for analyzing the graph 370 received and stored in the graph data structure storage 330 to identify the structure of the graph 370, weights associated with edges, and the like. The structure and weights are utilized to identify types of paths from nodes of interest to other nodes in the graph 370, e.g., 1-step (where steps are represented as edges or links) paths, 2-step paths, and paths of greater than 2-steps. Based on the identified structure, the graph analysis engine 340 may generate one or more groups of paths, where paths are grouped according to the length of the path and the particular end node, i.e. all paths in the same group have the same end node. Thus, for a particular starting node, or node of interest, paths to each other node in the graph 370 are identified and grouped into one or more groups based on length of the path and the end node to which the path leads from the starting node. Thus, each node in the graph 370, or a subset of nodes in the graph 370 that are designated as nodes of interest, may have associated groups of paths to other nodes in the graph 370. This information may be stored in the graph data structure storage 330 for further analysis.

For each node of interest in the graph 370, the corresponding groups of paths are analyzed by the relatedness metric calculation engine 350 to compute a strength of relationship (either exactly or approximately) between the node of interest and the end node of the particular group. The partial contributions of each path in the group are determined and used to calculate the strength of the relationship as described in greater detail hereafter. This process may be repeated for each node of interest in the graph data structure 370.

The blink model computation engine 300 outputs the results, e.g., nodes and their relatedness scores 390, to a post-processing unit 395 which operates on the results, e.g., nodes and relatedness scores 390, to perform functions on the results to formulate the results in such a way that they are meaningful to the requesting cognitive operation engine 362. This post-processing may take many forms depending upon the particular cognitive operation engine 362 requesting the results, and the reasons for the request, i.e. the way in which these results will be utilized by the cognitive operation engine. The post-processing unit 395, while shown as separate from the cognitive system 360 and blink model computation engine 300, is not limited to being implemented in a separate computing device. To the contrary, the post-processing unit 395 may be implemented in either of the cognitive system 360 or the blink model computation engine 300 without departing from the spirit and scope of the illustrative embodiments.

For example, continuing the earlier example, the relatedness scores 390 would contain 1000 names and 1000 scores respectively, representing the 1000 people that are most related to "Tom" in this social network. The post-processing unit 395 then performs any necessary post-processing that fits the need of the cognitive operation engine 362 that issued the request. For example, if a specific cognitive operation engine 362 is a "new contact recommendation" cognitive operation for a social networking environment, such as provided by Facebook™ or LinkedIn™, the post-processing unit 395 would filter the relatedness scores 390 to remove persons that are already on Tom's contact list, and sort the remaining persons in decreasing-score order. The cognitive operation engine 362 receives post-processed results, e.g., the filtered and sorted list, from the post-processing unit 395, and eventually displays the names in the "recommended-new-contacts section" portion of Tom's user interface, e.g., on Tom's LinkedIn™ landing page.

Note that the above description is only one example. The results, e.g., nodes and relatedness scores 390, may be post-processed differently to perform a knowledge-based, or cognitive, operation to achieve a desired functionality by the cognitive operation engines 362, e.g., providing recommendations to users, generating desired outputs, redirecting web browsers to related web sites, presenting advertising, identifying potentially related individuals, or a plethora of other functionalities that are based on a determined degree of relatedness of two or more objects, persons, concepts, documents, or any other entity that is able to be modeled as a node in a directed or undirected graph. As another example, in a QA cognitive system, these results, e.g., nodes and relatedness scores, may be used to identify related concepts that may then be used to analyze the corpus of information for information indicative of candidate answers to an input question and/or evidence in support candidate answers. In other social networking website cognitive systems, these results, which may be indicative of strengths of relationships between users, may be used to determine recommendations of communication associations between users, e.g., friend recommendations, professional associations, or the like.

To illustrate the operation of the blink model computation engine 300 more fully, consider that the edges in the graph 370 blink in accordance with their assigned weight value b such that the edge is present in the graph b fraction of the time, and is not present in the graph 1-b fraction of the time. The illustrative embodiments assume that each edge represents independent evidence of relatedness and thus, blinks independently, however the principles of the illustrative embodiments are also applicable to more complex embodiments in which the edge weights, and thus the blinking rate of the edges, are represented by a joint function that comprises a combination of related evidence factors. One way to interpret the blinking graph is to interpret edge weight values b as a belief on the corresponding evidence, rather than a conditional probability. Thus, in the 1-b fraction of the time the edge is not considered present in the blink model, the relationship is considered "unknown" rather than non-existent.

With this in mind, the strength of a relationship between a node of interest (or starting node) A and an end node B is the fraction of time that a path exists from node A to node B in this blinking graph. This is denoted as b(A, B) as defined earlier. In describing the illustrative embodiment of blink model computation engine 300, the description will primarily focus on s(A,B), as defined earlier, to take advantage of its additive properties. It should be noted that there is a one-to-one correspondence between b(A,B) and s(A,B) such that one can compute b(A,B) from s(A,B), and vice versa.

As discussed earlier, exact calculation of the strength of relationship metric is expensive to perform and therefore, when necessary, the blink model computation engine 300 approximates the strength of relationship metric, also referred to herein as the "relatedness metric," by separating the types of paths between nodes into a first set (or group) of paths comprising 1-step and 2-step paths, and a second set (or group) of paths which are paths that comprise greater than 2-steps. Thereafter, the contribution of each set of paths to the overall relatedness metric is computed and combined to generate an approximation of the relatedness metric for a particular subset, or pairing, of nodes, i.e. the node of interest or start node A and the end node B of a particular group of paths.

Figure 4:
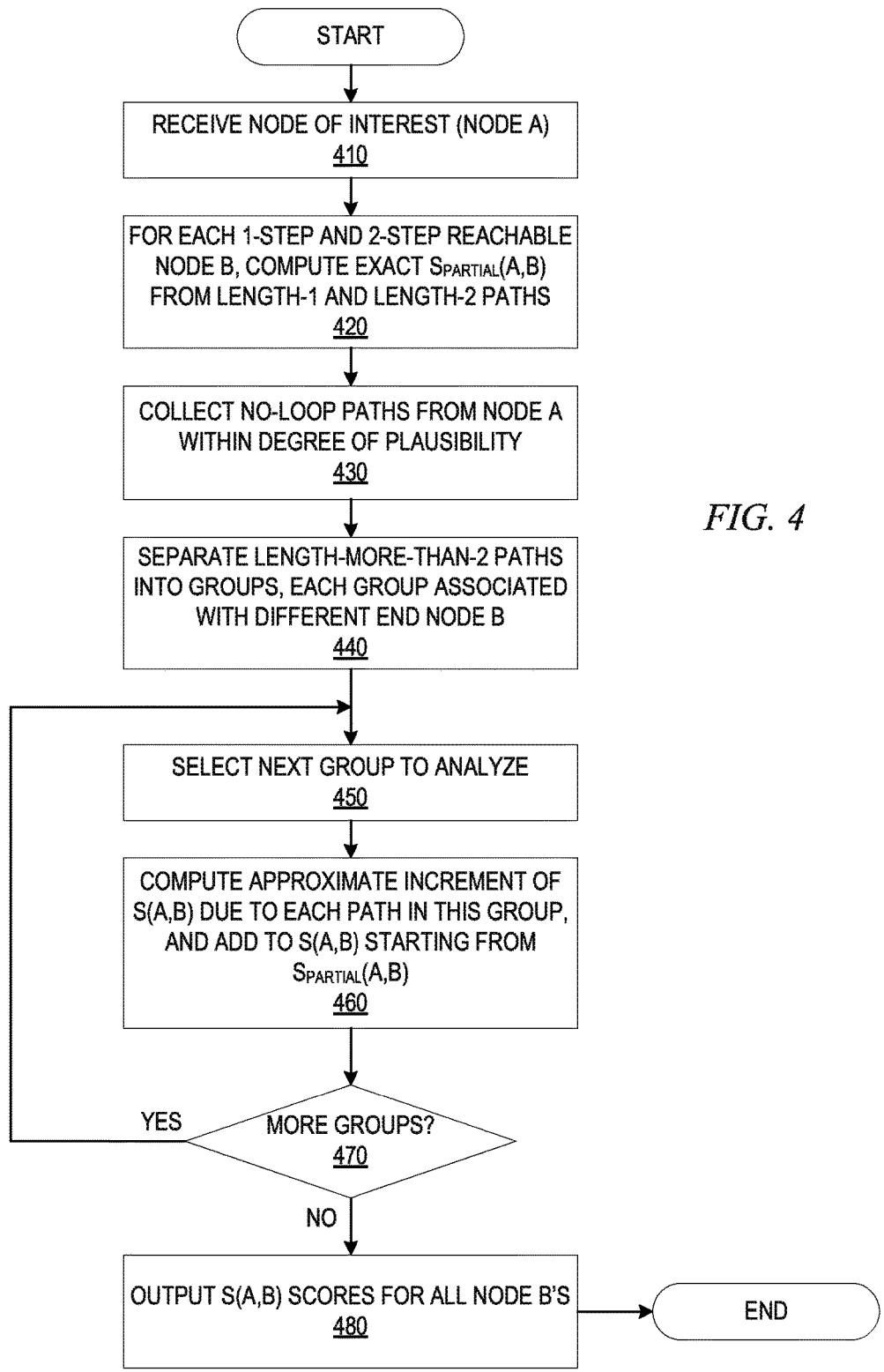
FIG. 4 is a flowchart outlining an example operation of a blink model computation engine when answering a query in accordance with one illustrative embodiment.

FIG. 4 is a flowchart outlining an example operation of a blink model computation engine when answering a query in accordance with one illustrative embodiment. FIG. 4 illustrates the separation of paths into different sets and the overall computation of their contribution to the relatedness metric based on this separation. The operation outlined in FIG. 4 may be performed by the relatedness metric calculation engine 350, for example, based on the groupings of paths generated by the graph analysis engine 340, for example. The grouping of paths (where a path may comprise one or more edges between nodes from the start node to the end node of the path) may be performed according to the number of steps (or edges) in the path. 1-step and 2-step paths may be combined into a first grouping (or set) of paths while other paths having more-than-2-steps may be grouped into separate groups (or sets) according to the paths having a same end node B. In the illustrative embodiments, only no-loop paths (paths that do not loop back to an earlier node in the path) from the start node A to the end node B that are greater-than-2-steps are grouped into separate groups or sets according to the paths having the same end node.

Thus, with reference to FIG. 4, given a node of interest (or start node) A (step 410), for each 1-step and 2-step reachable node (node B), the exact relatedness metric increment for that path is calculate (step 420), i.e. the $s_{partial}(A,B)$ is calculated for each 1-step and 2-step path. In this way, the contributions from the length-1 and length-2 paths are calculated exactly in an additive manner since there is no possibility of sharing edges among length-1 and length-2 paths from node A to end node B:

$$s_{partial}(A, B) = -\log(1 - b_{AB}) - \sum_{\text{length-2 path } i} \log(1 - b_{i,1} \cdot b_{i,2}) \quad (6)$$

where the summation is done over all of the length-2 paths, $b_{AB}$ is the weight of the direct edge from node A to node B, $b_{i,1}$ and $b_{i,2}$ are the weights of the first edge and the second edge of the ith length-2 path. Contributions from paths with length greater than 2 are no longer additive because they may share edges among themselves and with other length-2 paths. Thus, they must be discounted and the amount of the discount depends on the degree of sharing. Moreover, such longer paths tend to have a higher likelihood of not being present in the graph at any given time due to the blinking of the graph.

In order to approximate the contributions of the paths with length greater than 2, the approximation starts by collecting a set of no-loop paths starting from the node of interest A (step 430). This collection is done either deterministically or stochastically with the goal being to find all no-loop paths within a certain degree of plausibility which may be controlled by a minimum path value, e.g., the product of edge weight values, or by a maximum amount of fan-out along the way, e.g., the product of fan-out counts, other metrics to a similar effect, or combinations of these stopping criteria. It should be noted that each path represents multiple partial paths, e.g., one length-3 path to the third node, one length-4 path to the fourth node, etc. In the case of stochastic path collection, i.e. random walks, each path or partial path carries a fractional weight, and they asymptotically add up to the path collection.

The no-loop paths or partial paths with length more than 2 are then grouped according to a same end node B (step 440). For a next group in the set of generated groups for the node of interest A (step 450), the approximate increment of the relatedness metric s(A,B) due to each path in the group is calculated and added to the relatedness metric $s_{partial}(A,B)$ generated from the 1-step and 2-step paths in step 420 (step 460). A determination is made as to whether all of the groups associated with the node of interest A have been processed (step 470). If not, the operation returns to step 450 with the next group being selected and evaluated. If all groups associated with the node of interest A have been processed, the blink model computation engine 300 outputs the calculated s(A,B) scores for all node B's (step 480). The operation then terminates.

Figure 5:
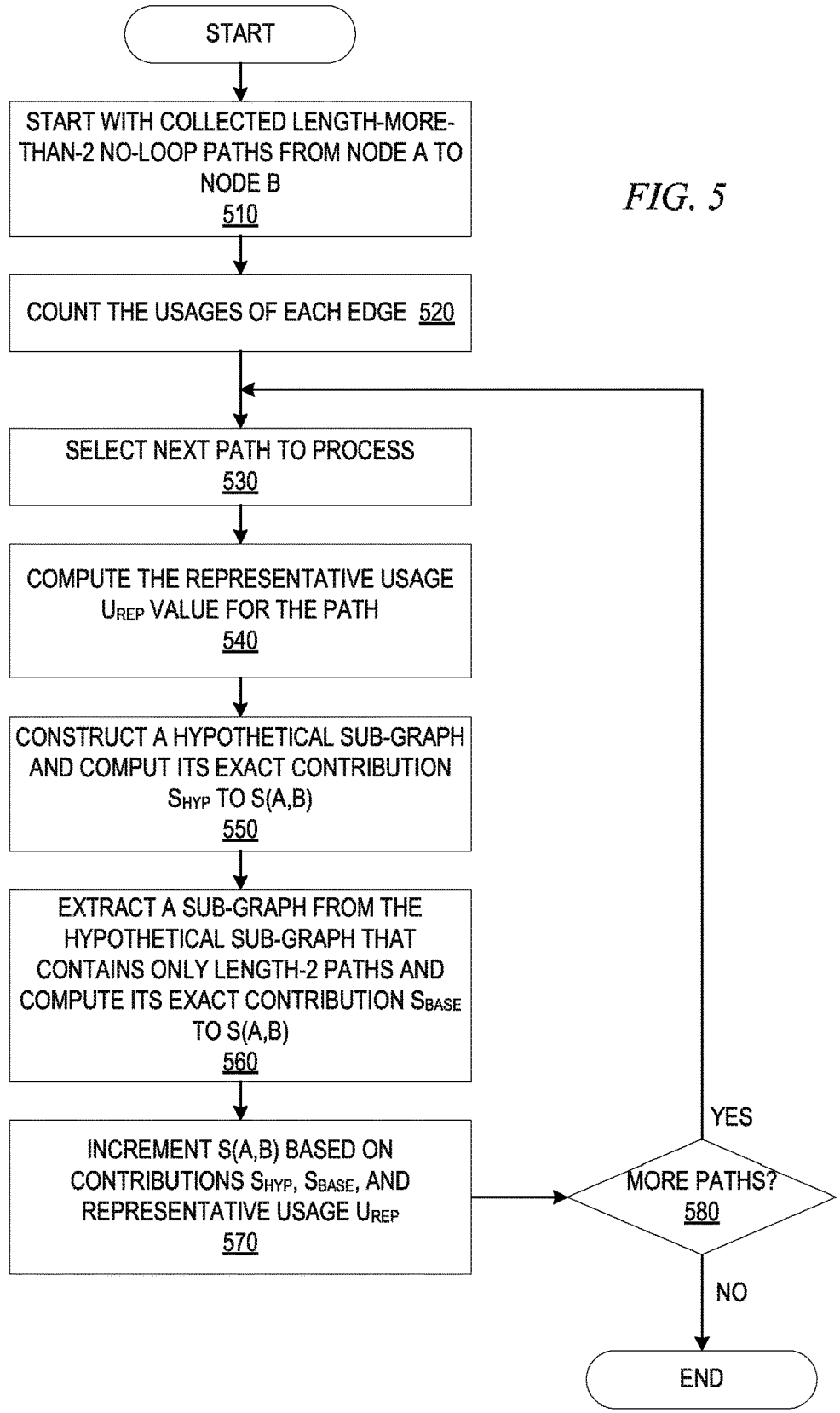
FIG. 5 is a flowchart outlining an example operation for performing a calculation of an approximate increment of a relatedness metric in accordance with one illustrative embodiment.

FIG. 5 is a flowchart outlining an example operation for performing a calculation of an approximate increment of a relatedness metric in accordance with one illustrative embodiment. The operation outlined in FIG. 5 is an expanded view of step 460 in FIG. 4, for example. As shown in FIG. 5, the operation starts with obtaining the collected length-more-than-2 no-loop paths for the group corresponding to the node of interest A and an end node B of the group (step 510). Within the group, the paths or partial paths are then overlapped such that a count of the usages of each edge is generated (step 520). The most detailed form of usages of an edge is the list of all length-more-than-2 no-loop A-to-B paths that passes this edge. However, an embodiment may choose to store an aggregated form rather than the most detailed form. For example, one may store the number of paths that passes this edge. For another example, one may store the following value $u_{edge\ e}$ per edge.

$$u_{edge\ e} = \sum_{path\ i\ that\ passes\ edge\ e} w_{path\ i} \quad (7)$$

$$\text{where } w_{path\ i} = -\log\left(1 - \prod_{edge\ j\ on\ path\ i} b_j\right)$$

where $b_j$ is the weight of edge j, using the same notation as in previous equations. It should be noted that $w_{path\ i}$ would be the exact contribution of path i to s(A,B) if it had no edge-sharing with any other path. Therefore, $w_{path\ i}$ represents a path weight, and $u_{edge\ e}$ represents a measure of usage of edge e by all length-more-than-2 no-loop A-to-B paths. In the following description of an illustrative embodiment, this definition of $u_{edge\ e}$ will be utilized.

Figure 6:
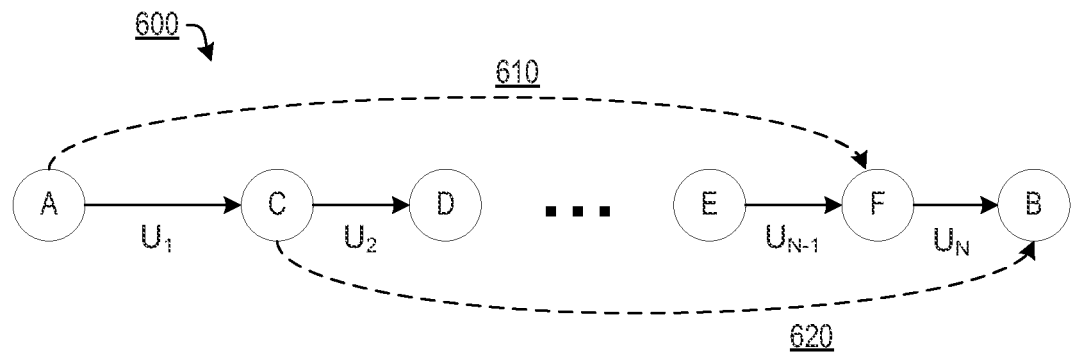
FIG. 6 is an example diagram of a portion of a graph that may be input to the approximation mechanisms of the illustrative embodiments for approximating a relatedness metric between a node of interest and an end node.

Thereafter, each length-more-than-2 path is analyzed to estimate its individual contribution to the relatedness metric between the node of interest A and the end node B for that group. For example, FIG. 6 is an example diagram of a sub-graph 600 that may be input to the approximation mechanisms of the illustrative embodiments for approximating a relatedness metric contribution by one path between a node of interest and an end node. As shown in FIG. 6, a path under analysis from node A to node B may comprise many edges between intermediate nodes C, D, E, and F as shown. Each edge along the path may have its own associated usage count $u_1, u_2, \ldots u_N$ calculated in accordance with step 520 above. The dashed arrows 610 and 620 in FIG. 6 represent length-2 paths that share either the first edge of the path or the last edge of the path (0 weight for an arrow if no such length-2 path exists).

In order to calculate these contributions, for a next path in the length-more-than-2 no-loop paths from node A to node B (step 530), a representative usage value for the path is computed based on the usages of each edge that make up the particular path (step 540). This representative usage is a value representative of an amount of sharing of links along the path from the node of interest to the end node for the group. The way in which this representative usage value is calculated may take many different forms depending on the particular implementation. In one illustrative embodiment, the representative usage value $u_{rep}$ may be selected as the maximum of the usage counts $u_1, u_2, \ldots u_N$ of the edges of the path. In another illustrative embodiment, a weighted average of these usage counts may be utilized to calculate the representative usage value. In still another illustrative embodiment, a weighted geographic mean may be utilized. Any mechanism for calculating a representative usage value based on the usage counts of the edges that make up the path may be utilized without departing from the spirit and scope of the illustrative embodiments. It should be noted that the representative usage value is not necessarily an integer value. In the following description of an illustrative embodiment, $u_{rep}$ is assumed to be the maximum of $u_1, u_2, \ldots u_N$ for purposes of illustration only and is not intended to be limiting on the type of representative usage values that may be utilized in various embodiments of the present invention.

A hypothetical sub-graph is then constructed to replace the original path from the node of interest A to the end node B (step 550). The hypothetical sub-graph has edge weights that are calculated as a function of the original edge weights $b_1, b_2, \ldots b_N$ in the original path, the usage values $u_1, u_2, \ldots u_N$ of the original edges, and the representative usage value $u_{rep}$ for this path from step 540. There are many different ways to construct such a hypothetical sub-graph with varying complexity. A most detailed hypothetical sub-graph would have the same depth as the original path with additional edges and auxiliary nodes. More complex embodiments will be described later. For clarity, the present description will first reference the simplest form of sub-graph as shown in FIG. 7, described hereafter.

Figure 7:
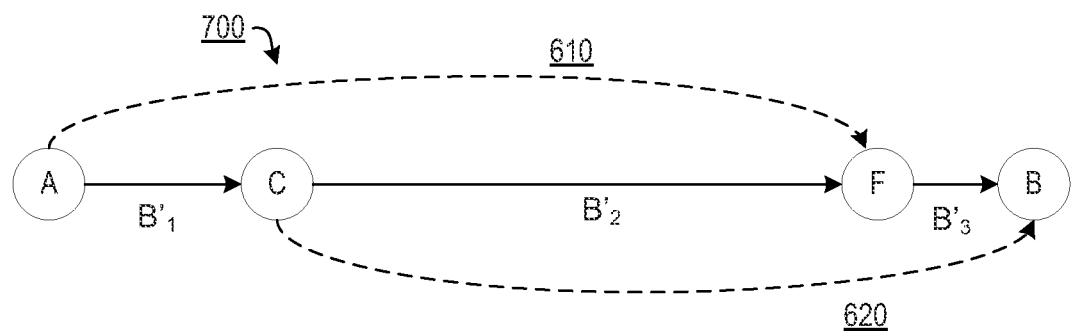
FIG. 7 is an example diagram of a hypothetical sub-graph that is constructed for the portion of the graph shown in FIG. 6 in accordance with one illustrative embodiment.

FIG. 7 is an example diagram of a hypothetical sub-graph 700 that is constructed for the portion of the graph 600 shown in FIG. 6 in accordance with one illustrative embodiment. As shown in FIG. 7, the first edge from node A to node C has a newly calculated weight $b'_1$, the second edge from node C to node F has a newly calculated weight $b'_2$, and the third edge from node F to the end node B has a newly calculated weight $b'_3$. These weight values may be computed from the original edge weights $b_1, b_2, \ldots b_N$, using the following relationships:

$$b'_1 = 1 - (1 - b_1)^{u_{rep}/u_1} \quad (8)$$

$$b'_2 = 1 - \left(1 - \prod_{i=2}^{N-1} b_i\right)^{u_{rep}/u_{mean}}$$

$$b'_3 = 1 - (1 - b_N)^{u_{rep}/u_N}$$

where $u_{mean}$ is a weighted average of $u_2 \ldots u_{N-1}$, which may be calculated as follows:

$$u_{mean} = \frac{\sum_{i=2}^{N-1} u_i \cdot \log(b_i)}{\sum_{i=2}^{N-1} \log(b_i)} \quad (9)$$

The contribution, $s_{hyp}$, of this constructed hypothetical sub-graph 700, as shown in FIG. 7, to the relatedness metric s(A,B) is then calculated by exact calculation. Such calculation enumerates, explicitly or implicitly, all 32 blinking states of the five edges shown in the sub-graph 700 in FIG. 7, and has been described in detail earlier in the present description with regard to exact calculation of the blink model. It should be noted that in such a calculation, the two dashed edges have their original edges weights from the input graph.

Figure 8:
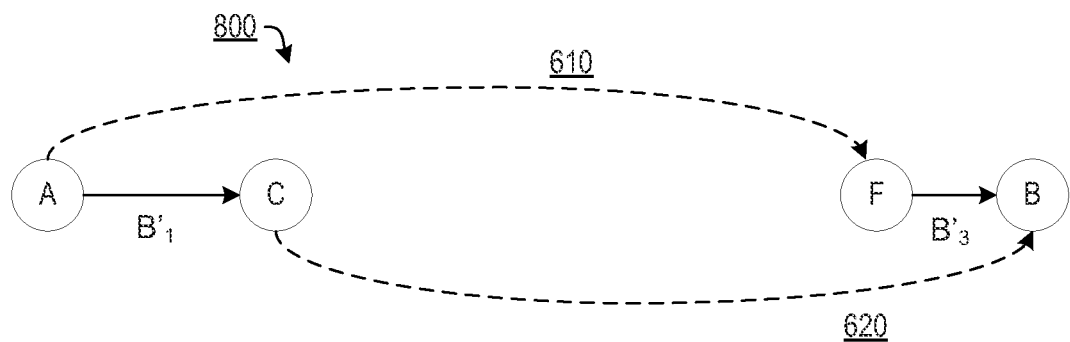
FIG. 8 is an example diagram of a sub-graph of the hypothetical sub-graph of FIG. 7 constructed in accordance with one illustrative embodiment.

Next, a sub-graph of the hypothetical sub-graph is generated that comprises only length-2 paths (step 560). FIG. 8 is an example diagram of a sub-graph 800 of the hypothetical sub-graph 700 of FIG. 7 constructed in accordance with one illustrative embodiment. As shown in FIG. 8, the sub-graph 800 comprises only length-2 paths A-F-B and A-C-B from the hypothetical sub-graph 700 in FIG. 7.

The contribution, $s_{base}$, of this sub-graph 800 of the hypothetical sub-graph 700 to the relatedness metric s(A,B) is then calculated by exact calculation. It should be noted that, because FIG. 8 is composed of two disjoint paths, it is not necessary to explicitly enumerate all 16 blinking states of the four edges, but instead the following formula may be used for faster calculation:

$$s_{base} = -\log(1 - b'_1 \cdot b_{CB}) - \log(1 - b'_3 \cdot b_{AF}) \tag{10}$$

where $b_{CB}$ and $b_{AF}$ are the weights of edges from C to B and from A to F respectively.

Thereafter, the contribution of this path under analysis from the node of interest A to the end node B is calculated based on a function of the relatedness metric contribution of the hypothetical sub-graph ($s_{hyp}$), discounted by the contribution of the sub-graph of the hypothetical sub-graph ($s_{base}$), and diluted by the representative usage ($u_{rep}$) (step 570). The contribution is added to the previously calculated relatedness metric for the path from node A to node B, i.e. s(A,B), which included the partial contributions of the length-1 and length-2 paths, as well as length-more-than-2 paths that have been analyzed so far. For example, s(A,B) may be updated as follows:

$$s(A, B) = s(A, B) + (s_{hyp} - s_{base}) \cdot \frac{w_{thispath}}{u_{rep}} \tag{11}$$

where $w_{this\ path}$ is the path weight that is defined above when describing step 520 in FIG. 5, and is the path weight of this specific path under analysis. It should be noted that the value $$\frac{w_{this\ path}}{u_{rep}}$$

is essentially a dilution factor. For example, if this path under analysis happens to share each edge with 9 other paths of equal weight, this dilution factor would be equal to 1/10.

A determination is made as to whether there are any more paths in the group to evaluate in this manner (step 580). If so, the operation returns to step 530 where the operation is performed again with regard to the next path in the group. In this way, the process may be repeated for each length-more-than-2 path from the node of interest A to the end node B of the particular group with the resulting relatedness metric s(A,B) being incremented with the resulting values. Once all of the length-more-than-2 paths are processed in this manner, the resulting relatedness metric provides an accurate approximation of the relatedness metric for the edge between the node of interest and the end node of that particular group.

Optionally, an outer loop can be added to iteratively refine the above calculation per group. That is, after the individual contributions of all length-more-than-2 paths are calculated, these individual contribution values may be used as new path-weight values, $w_{path\ i}$, and thereby repeat step 520 to update the usages of each edge in the original graph. Then each length-more-than-2 path may be re-analyzed as described above by steps 530 through 580. Now the individual contributions of all length-more-than-2 paths have been updated to seed the next iteration. A small number of iterations is sufficient to further improve accuracy. The above per-group calculation process is then repeated for each group such that a plurality of relatedness metrics may be generated, one from the node of interest to another node in the original graph, e.g., the original directed/undirected hyper graph.

The above description illustrates a complete description of the operation of one illustrative embodiment, which includes the production of a hypothetical sub-graph in the form of FIG. 7, e.g., as part of step 550. Hereafter are descriptions of alternative embodiments of step 550 which produce more complex forms of hypothetical sub-graphs, and which potentially enable higher accuracy at the cost of longer runtime. Some of these alternative embodiments of step 550 also involve modification to step 540, as described hereafter.

Figure 9:
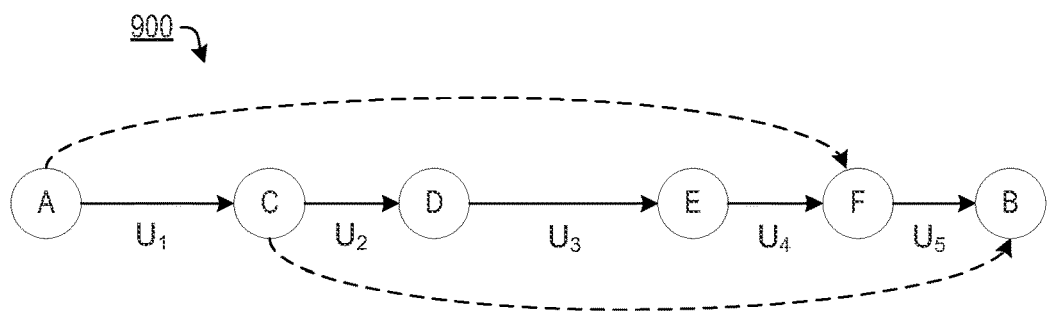
FIG. 9 is an example diagram of a portion of a graph that may be input to the approximation mechanisms of the illustrative embodiments for approximating a relatedness metric between a node of interest and an end node.

FIG. 9 is an example diagram of a portion of a graph that may be input to the approximation mechanisms of the illustrative embodiments for approximating a relatedness metric between a node of interest and an end node. The example path 900 shown in FIG. 9 is similar to that of FIG. 6 above but with N=5. As an illustrative example, it is assumed that $u_1 > u_5 > u_2 > u_4 > u_3$.

Figure 10:
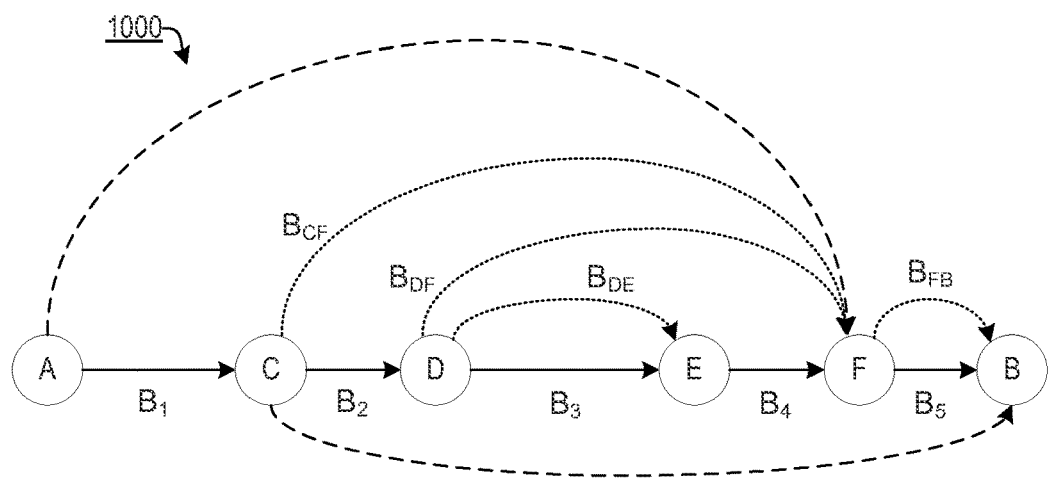
FIG. 10 is an example diagram of a hypothetical sub-graph that is constructed for the portion of the graph shown in FIG. 9 in accordance with one illustrative embodiment.

FIG. 10 is an example diagram of a hypothetical sub-graph that is constructed for the portion of the graph shown in FIG. 9 in accordance with one illustrative embodiment. FIG. 10 illustrates the hypothetical sub-graph 1000 that is produced by one of the alternative embodiments of step 550 in FIG. 5 based on the example path 900 of FIG. 9. The original five edges of the path 900 remain here and they retain their original weights $b_1, \ldots b_5$, while hypothetical new edges (dotted arrows in FIG. 10) are added from node D to node E, from node D to node F, from node C to node F, and from node F to node B, each with weight values calculated from $b_1, \ldots b_5$ and $u_1, \ldots u_5$.

The rationale of adding each new edge is as follows: since $u_4 > u_3$, there must be one or more A-to-B path(s) that passes the edge from E to F but that does not pass the edge from D to E. Therefore, a hypothetical new edge from D to E is added to represent the effect of such path(s). Similarly, since $u_2 > u_4$, there must be one or more A-to-B path(s) that passes the edge from C to D, but that does not pass the edge from E to F, the edge from D to E, or paths represented by the hypothetical edge from D to E. Therefore, a hypothetical new edge from D to F is added to represent the effect of such path(s). The same rationale applies to adding a hypothetical edge from C to F, and another from F to B. The weights of these hypothetical edges are calculated as follows:

$$b_{DE} = 1 - (1 - b_3)^{\frac{u_4 - u_3}{u_3}} \tag{12}$$

$$b_{DF} = 1 - \left(1 - b_4 \cdot \left(1 - (1 - b_3)^{\frac{u_4}{u_3}}\right)\right)^{\frac{u_2 - u_4}{u_4}}$$

$$b_{CF} = 1 - \left(1 - b_2 \cdot \left(1 - (1 - b_{DF})^{\frac{u_2}{u_2 - u_4}}\right)\right)^{\frac{u_1 - u_2}{u_2}}$$

$$b_{FB} = 1 - (1 - b_5)^{\frac{u_1 - u_5}{u_5}}$$

With all edge weights known in the hypothetical sub-graph of FIG. 10, one can calculate the hypothetical sub-graph's exact contribution to s(A,B), as in the previous description of step 550 above. It should be noted that with careful arrangement of enumeration in the exact contribution, one does not need to explicitly enumerate all blinking states of edges in FIG. 10, but some states can be implicitly enumerated in aggregation. The computational complexity is linear with respect to the length N of the path under analysis. No modification to step 540 is needed and thus, as in the previous description above, $u_{rep}$ is simply $u_1$, the maximum of $u_1, \ldots u_5$. It should be noted that when N is 3, this alternative embodiment of step 550 produces the same result as the previous description of step 550. In fact, the only difference between the two embodiments is that the previous embodiment makes a simple and averaged model for the middle section from C to F, while this embodiment performs a more detailed analysis.

In a third illustrative embodiment of step 550 even more detailed analysis may be performed. This requires step 520 to store usages of edges in the most detailed form. As described earlier, the most detailed form of usages of an edge is the list of all length-more-than-2 no-loop A-to-B paths that passes this edge. For clarity of presentation, again assume the path 900 shown in FIG. 9 as an example path under analysis. Instead of adding hypothetical edges based on aggregated usage values as in the previous second embodiment, the present third illustrative embodiment of step 550 adds hypothetical edges by tracing the actual paths that intersect with the path under analysis.

Figure 11:
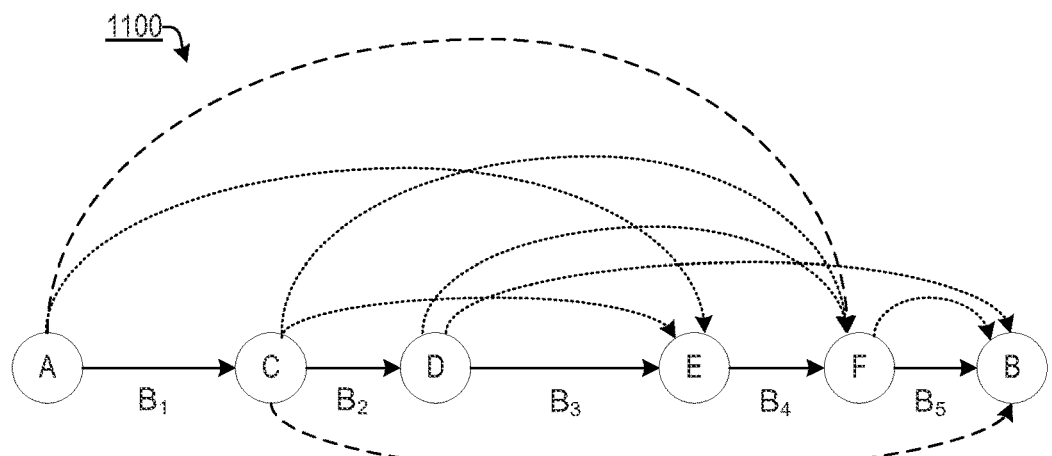
FIG. 11 is an example diagram of a hypothetical sub-graph that is constructed for the portion of the graph shown in FIG. 9 in accordance with one illustrative embodiment.

FIG. 11 is an example diagram of a hypothetical sub-graph 1100 that is constructed for the portion of the graph shown in FIG. 9 in accordance with the third illustrative embodiment. Each dotted arrow is a hypothetical edge that represents a segment of another path. For example, the hypothetical edge from C to E represents the C-to-E segment of another A-to-B path that passes nodes C and E but that does not pass node D. The original five edges retain their original weights $b_1, \ldots b_5$, while the weight of each hypothetical edge is the product of edge weights in the path segment that it represents.

It is possible to perform exact calculation to obtain the exact contribution of such a hypothetical sub-graph 1100 to s(A,B), as in previous descriptions of step 550. However, because the hypothetical sub-graph 1100 no longer has the simple topology as in the previous illustrative embodiments, the computational complexity of the exact calculation is exponential with respect to the length N of the path under analysis, and is therefore prohibitive for longer paths. For paths where exact calculation is too expensive in this illustrative embodiment of step 550, an approximate method may be used to calculate the contribution of the hypothetical sub-graph 1100 to s(A,B). This approximation method works by "merging" hypothetical edges, i.e. dotted arrows in FIG. 11, one by one into the main path from A to C to D to E to F to B.

Figure 12:
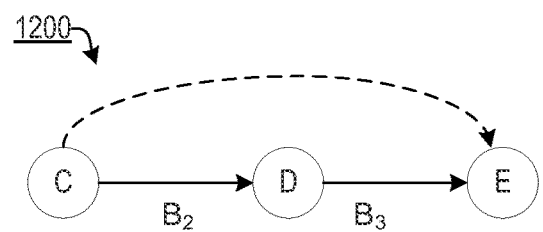
FIG. 12 is an example diagram of one operation on a sub-graph in accordance with one illustrative embodiment.
Figure 12:
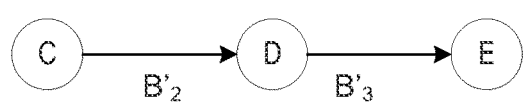

One such "merging" operation is illustrated in FIG. 12, where the hypothetical edge from C to E is deleted while the edge weights from C to D and from D to E are updated. The updated edges are as follows:

$$b'_2 = b_2^\beta \quad (13)$$

$$b'_3 = b_3^\beta$$

$$\text{where } \beta = \frac{\log\left(1 - (1 - b_2 \cdot b_3)^{\frac{u_{CE}}{u_{CDE}}}\right)}{\log(b_2) + \log(b_3)}$$

$$\text{where } u_{CE} = \sum_{\text{path } i \text{ that passes } C \text{ and } E} w_{\text{path } i},$$

$$u_{CDE} = \sum_{\text{path } i \text{ that passes } C, D, \text{ and } E} w_{\text{path } i}$$

where $w_{path\ i}$ is the path weight of path i, just as defined earlier. With such operations, the hypothetical edges are removed one by one, and the weights of the original edges get updated in each step. Eventually the topology of the hypothetical sub-graph 1100 becomes the same as FIG. 9, and the rest of the calculation is performed by exact calculation. It should be noted that since this sequence of merging operations is an approximate method, the order in which to remove hypothetical edges does affect the final result. In one illustrative embodiment, a simple choice is to process the hypothetical edges in an increasing-path-weight order, where path weight is weight of the path(s) of which the hypothetical edge represents a segment.

With the above described third embodiment of step 550, the step 540 may also be modified. For the FIG. 9 and FIG. 11 examples, $u_{rep}$ is given by the following:

$$u_{rep} = \sum_{\substack{\text{path } i \text{ that shares at least one} \\ \text{edge with } A\text{-}C\text{-}D\text{-}E\text{-}F\text{-}B \text{ path}}} w_{\text{path } i} \quad (14)$$

Thus, three different embodiments of step 550 are described above with increasing complexities. It should be noted that there are many possible illustrative embodiments that can be variations, middle-ground, or combinations of the three described herein. For example, in a system where the cognitive operation engines 362 require different accuracy levels in different query requests, the blink model computation engine 300 may obtain some scores with the first illustrative embodiment of step 550, while obtain other scores may be obtained with the third illustrative embodiment of step 550. For another illustrative embodiment, within analysis of one path, one may use a combination of the second and third illustrative embodiments of step 550, where some hypothetical edges are created by tracing actual paths, while others are created by analyzing aggregated edge usage values.

Figure 13:
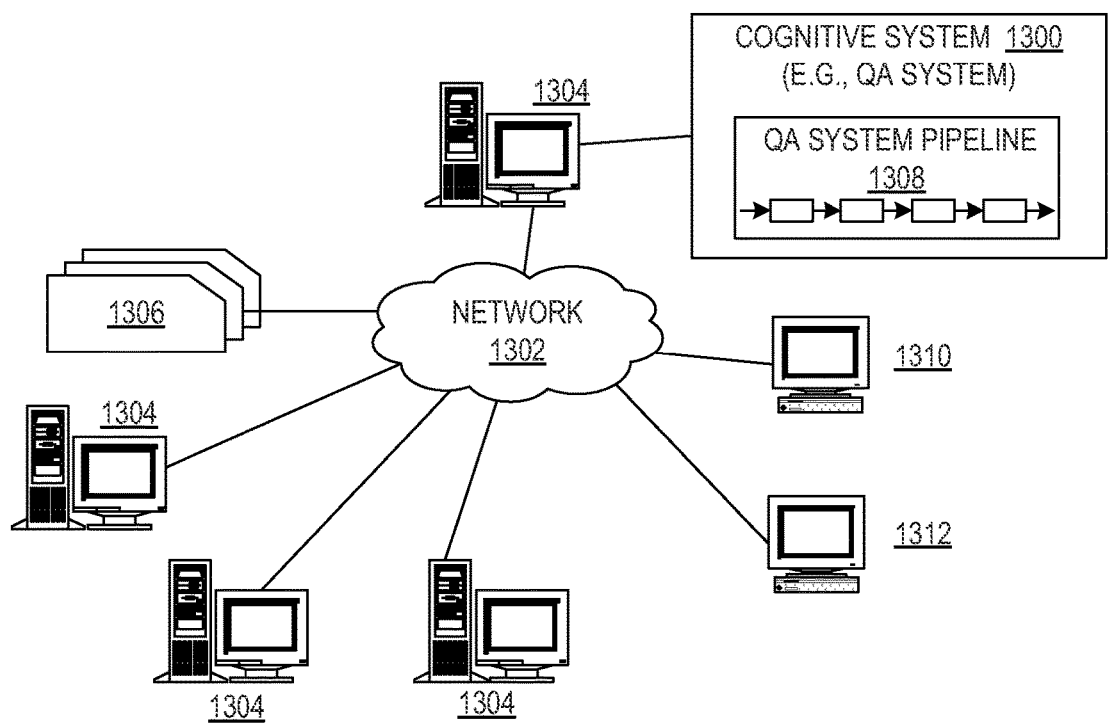
FIG. 13 depicts a schematic diagram of one illustrative embodiment of a cognitive system implementing a question answering (QA) pipeline in a computer network.
Figure 14:
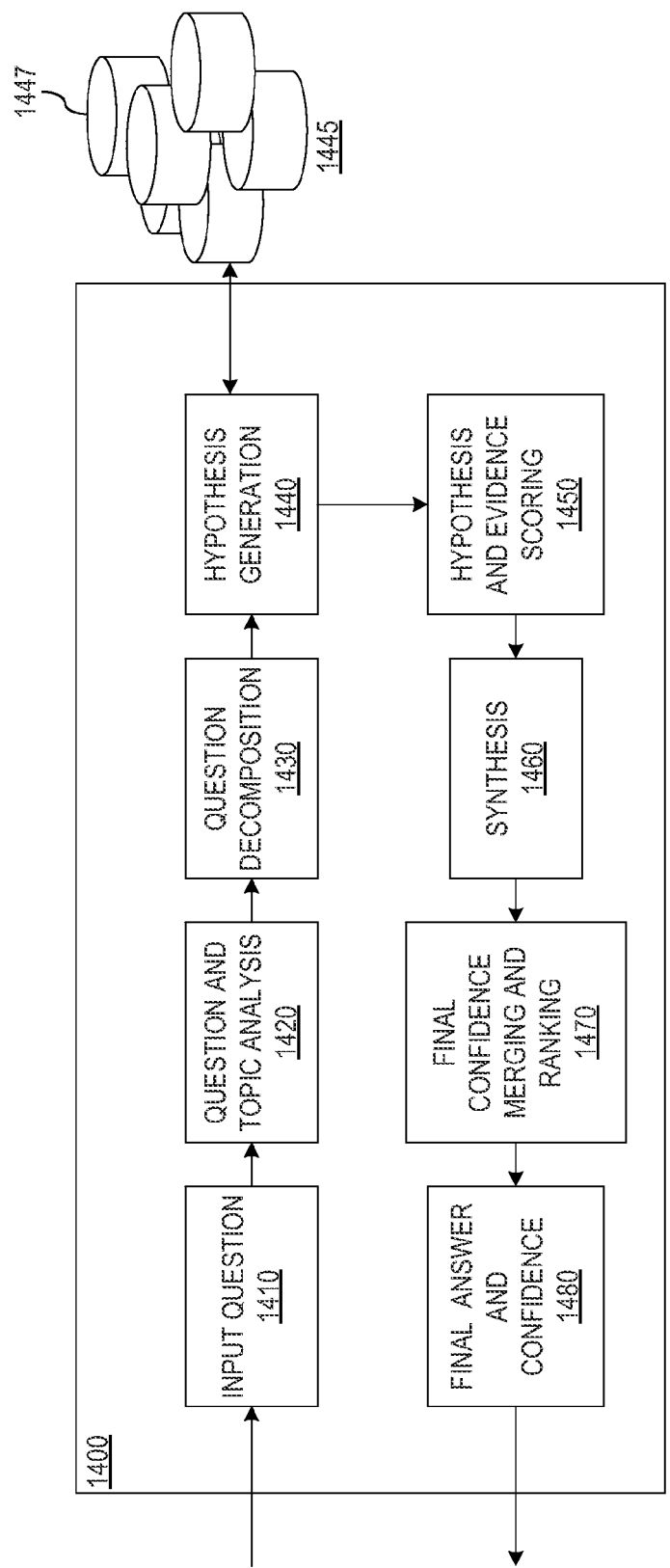
FIG. 14 illustrates a QA system pipeline, of a cognitive system, for processing an input question in accordance with one illustrative embodiment.

As mentioned with regard to FIG. 3 above, the resulting relatedness metrics may be used to a results output to the cognitive system 360 for use in performing cognitive operations. Also as mentioned above, one such cognitive system may include a question and answer (QA) cognitive system, such as the IBM Watson™ cognitive system. FIGS. 13 and 14 are example diagrams illustrating an example implementation of an IBM Watson™ cognitive system in which aspects of the present invention may be implemented.

FIG. 13 depicts a schematic diagram of one illustrative embodiment of a cognitive system 100 in FIG. 1, or 360 in FIG. 3, implementing a question answering (QA) pipeline 1308 in a computer network 1302. One example of a question/answer generation operation which may be used in conjunction with the principles described herein is described in U.S. Patent Application Publication No. 2011/0125734, which is herein incorporated by reference in its entirety. The cognitive system 1300 is implemented on one or more computing devices 1304 (comprising one or more processors and one or more memories, and potentially any other computing device elements generally known in the art including buses, storage devices, communication interfaces, and the like) connected to the computer network 1302. The network 1302 includes multiple computing devices 1304 in communication with each other and with other devices or components via one or more wired and/or wireless data communication links, where each communication link comprises one or more of wires, routers, switches, transmitters, receivers, or the like. The cognitive system 1300 and network 1302 enables question/answer (QA) generation functionality for one or more cognitive system users via their respective computing devices 1310-1312. Other embodiments of the cognitive system 1300 may be used with components, sub-systems, and/or devices other than those that are depicted herein.

The cognitive system 1300 is configured to implement a QA pipeline 1308 that receive inputs from various sources. For example, the cognitive system 1300 receives input from the network 1302, a corpus of electronic documents 1306, cognitive system users, and/or other data and other possible sources of input. In one embodiment, some or all of the inputs to the cognitive system 1300 are routed through the network 1302. The various computing devices 1304 on the network 1302 include access points for content creators and QA system users. Some of the computing devices 1304 include devices for a database storing the corpus of data 1306 (which is shown as a separate entity in FIG. 13 for illustrative purposes only). Portions of the corpus of data 1306 may also be provided on one or more other network attached storage devices, in one or more databases, or other computing devices not explicitly shown in FIG. 13. The network 1302 includes local network connections and remote connections in various embodiments, such that the cognitive system 1300 may operate in environments of any size, including local and global, e.g., the Internet.

In one embodiment, the content creator creates content in a document of the corpus of data 1306 for use as part of a corpus of data with the cognitive system 1300. The document includes any file, text, article, or source of data for use in the cognitive system 1300. QA system users access the cognitive system 1300 via a network connection or an Internet connection to the network 1302, and input questions to the cognitive system 1300 that are answered by the content in the corpus of data 1306. In one embodiment, the questions are formed using natural language. The cognitive system 1300 parses and interprets the question via a QA pipeline 1308, and provides a response to the cognitive system user, e.g., cognitive system user 1310, containing one or more answers to the question. In some embodiments, the cognitive system 1300 provides a response to users in a ranked list of candidate answers while in other illustrative embodiments, the cognitive system 1300 provides a single final answer or a combination of a final answer and ranked listing of other candidate answers.

The cognitive system 1300 implements the QA pipeline 1308 which comprises a plurality of stages for processing an input question and the corpus of data 1306. The QA pipeline 1308 generates answers for the input question based on the processing of the input question and the corpus of data 1306. The QA pipeline 1308 will be described in greater detail hereafter with regard to FIG. 14.

In some illustrative embodiments, the cognitive system 1300 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with the illustrative embodiments, the cognitive system 100 is further augmented to include logic implemented in specialized hardware, software executed on hardware, or any combination of specialized hardware and software executed on hardware, for implementing a the blinking graph approximation mechanisms discussed above to approximate the relatedness metrics between objects. This logic may be used, for example, during ingestion of a corpus to relate extracted concepts and entities in documents of the corpus to one another. For example, during ingestion, documents may be processed to extract features, e.g., concepts, entities, and the like, which are then represented in a graph as nodes with edges connecting these nodes. The mechanisms of the illustrative embodiments may process this graph in the manner previously discussed to determine a relatedness metric between nodes of the graph and thereby increase the accuracy of the processing performed by the QA cognitive system when answering questions. Moreover, this logic may be used to relate extracted features of an input question to concepts, entities, or other features found in the corpus.

FIG. 14 illustrates a QA system pipeline, of a cognitive system, for processing an input question in accordance with one illustrative embodiment. The QA system pipeline of FIG. 14 may be implemented, for example, as QA pipeline 1308 of cognitive system 1300 in FIG. 13. It should be appreciated that the stages of the QA pipeline shown in FIG. 14 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 14 is augmented, for example, in one or more of the stages to implement the improved mechanism of the illustrative embodiments described hereafter, additional stages may be provided to implement the improved mechanism, or separate logic from the pipeline 1400 may be provided for interfacing with the pipeline 1400 and implementing the improved functionality and operations of the illustrative embodiments.

As shown in FIG. 14, the QA pipeline 1400 comprises a plurality of stages 1410-1480 through which the cognitive system operates to analyze an input question and generate a final response. In an initial question input stage 1410, the QA pipeline 1400 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 1400, i.e. the question and topic analysis stage 1420, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 14, the identified major features are then used during the question decomposition stage 1430 to decompose the question into one or more queries that are applied to the corpora of data/information 1445 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 1445. That is, these various sources themselves, different collections of sources, and the like, represent a different corpus 1447 within the corpora 1445. There may be different corpora 1447 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 1447 within the corpora 1445.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 1440 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 1440, to generate hypotheses for answering the input question. These hypotheses are also referred to herein as "candidate answers" for the input question. For any input question, at this stage 1440, there may be hundreds of hypotheses or candidate answers generated that may need to be evaluated.

The QA pipeline 1400, in stage 1450, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 1460, the large number of scores generated by the various reasoning algorithms are synthesized into confidence scores or confidence measures for the various hypotheses. This process involves applying weights to the various scores, where the weights have been determined through training of the statistical model employed by the QA pipeline 1400 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 1400 that identifies a manner by which these scores may be combined to generate a confidence score or measure for the individual hypotheses or candidate answers. This confidence score or measure summarizes the level of confidence that the QA pipeline 1400 has about the evidence that the candidate answer is inferred by the input question, i.e. that the candidate answer is the correct answer for the input question.

The resulting confidence scores or measures are processed by a final confidence merging and ranking stage 1470 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 1480, a final answer and confidence score, or final set of candidate answers and confidence scores, are generated and output to the submitter of the original input question via a graphical user interface or other mechanism for outputting information.

As noted above, the mechanisms of the illustrative embodiments may be utilized with the mechanisms of a QA cognitive system and QA system pipeline such as shown in FIG. 14. For example, the mechanisms of the illustrative embodiments may be utilized as part of the ingestion of the corpus or corpora 1445, 1447, or may be integrated in, or accessible by, one or more stages of the pipeline 1400 so as to facilitate evaluating the relatedness of features extracted from the input question and/or features extracted from portions of the corpus or corpora 1445, 1447 which are represented in a graph form having nodes and edges. Moreover, as noted above, the QA cognitive system is only one example of a cognitive system in which the mechanisms of the illustrative embodiments may be implemented and many other types of cognitive systems that draw relationships between objects may be utilized with the mechanisms of the illustrative embodiments, and may incorporate the mechanisms of the illustrative embodiments, without departing from the spirit and scope of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for performing a cognitive operation, the method comprising:

receiving, by the data processing system, an input graph comprising a plurality of first nodes, where subsets of first nodes in the plurality of first nodes are coupled to one another via one or more first edges and each first edge in the one or more first edges has an associated weight value;

generating, by the data processing system, a blinking graph model based on the graph, wherein the blinking graph model comprises blink rate values associated with second edges of the blinking graph model calculated based on weights of corresponding first edges in the input graph, wherein the blink rate value specifies a fraction of time a corresponding second edge is determined to be present in the blinking graph model;

receiving, by the data processing system, a request for performance of a cognitive operation, wherein the request comprises an identification of a node of interest, calculating, by the data processing system, a relatedness metric for a target node in the blinking graph model relative to the node of interest based on the blink rate values of the second edges, wherein the relatedness metric indicates a degree of relatedness of the target node to the node of interest, wherein calculating the relatedness metric for the target node comprises calculating the relatedness metric for each path from the node of interest to a plurality of target nodes in the blinking graph model; and performing, by the data processing system, a cognitive operation based on the relatedness metric.

2. The method of claim 1, wherein calculating the relatedness metric further comprises:

identifying, by the data processing system, for the node of interest specified in the request for the cognitive operation, a first set of paths within the blinking graph model for which an exact calculation of a contribution to the relatedness metric of a target node is able to be calculated; and calculating, by the data processing system, for a combination of the node of interest and a second node associated with a path in the first set of paths, a first contribution to the relatedness metric based on the exact calculation associated with the path in the first set of paths.

3. The method of claim 2, wherein calculating the relatedness metric further comprises:

identifying, by the data processing system, for the node of interest, a second set of paths within the blinking graph model for which an approximation calculation of a contribution to the relatedness metric of the target node is to be calculated;

calculating, by the data processing system, for a combination of the node of interest and a third node associated with a path in the second set of paths, a second contribution to the relatedness metric based on the approximation calculation associated with the path in the second set of paths; and combining, by the data processing system, the first contribution and the second contribution to generate the relatedness metric.

4. The method of claim 3, wherein the first set of paths are paths that have two or less edges that define the path and do not have a loop in the path, and wherein the second set of paths are paths that have more than two edges that define the path.

5. The method of claim 3, wherein combining the first contribution and the second contribution to generate the relatedness metric further comprises diluting the combination of the first contribution and the second contribution by an amount of edge sharing determined to be present in the paths of the first set of paths and paths of the second set of paths.

6. The method of claim 1, wherein calculating the relatedness metric for the target node comprises:

determining, by the data processing system, for each path from the node of interest to a plurality of other nodes in the blinking graph model, a degree of sharing of second edges along the path; and approximating, by the data processing system, the relatedness metric for each path based on blink rate values of the edges that are part of the path and the degree of sharing of the edges that are part of the path.

7. The method of claim 1, wherein blink rate values associated with second edges of the blinking graph model are specified as either an individual blink rate values associated with a corresponding second edge such that the corresponding second edge has a blink rate value independent of other second, or as a joint function of a plurality of blink rate values associated with different types of evidence supporting a relationship modeled by the corresponding second edge such that the corresponding second edge has a blink rate value based on a combination of the plurality of blink rate values.

8. The method of claim 1, wherein the cognitive operation is an operation to identify users of an online service that are determined to have similar attributes to a user of interest and present a listing of the identified users to the user of interest.

9. The method of claim 1, wherein the cognitive operation is a question answering operation that generates an answer to an input natural language question, and wherein the data processing system comprises a question and answer system that performs the question answering operation.

10. A computer program product comprising a computer readable storage medium having a computer readable program stored therein, wherein the computer readable program, when executed on a computing device, causes the computing device to:

receive an input graph comprising a plurality of first nodes, where subsets of first nodes in the plurality of first nodes are coupled to one another via one or more first edges and each first edge in the one or more first edges has an associated weight value;

generate a blinking graph model based on the graph, wherein the blinking graph model comprises blink rate values associated with second edges of the blinking graph model calculated based on weights of corresponding first edges in the input graph, wherein the blink rate value specifies a fraction of time a corresponding second edge is determined to be present in the blinking graph model;

receive a request for performance of a cognitive operation, wherein the request comprises an identification of a node of interest;

calculate a relatedness metric for a target node in the blinking graph model relative to the node of interest based on the blink rate values of the second edges, wherein the relatedness metric indicates a degree of relatedness of the target node to the node of interest, wherein the relatedness metric is calculated for the target node at least by calculating the relatedness metric for each path from the node of interest to a plurality of target nodes in the blinking graph model; and perform a cognitive operation based on the relatedness metric.

11. The computer program product of claim 10, wherein the computer readable program further causes the computing device to calculate the relatedness metric further at least by:

identifying, for the node of interest specified in the request for the cognitive operation, a first set of paths within the blinking graph model for which an exact calculation of a contribution to the relatedness metric of a target node is able to be calculated; and calculating, for a combination of the node of interest and a second node associated with a path in the first set of paths, a first contribution to the relatedness metric based on the exact calculation associated with the path in the first set of paths.

12. The computer program product of claim 11, wherein the computer readable program further causes the computing device to calculate the relatedness metric further at least by:

identifying, for the node of interest, a second set of paths within the blinking graph model for which an approximation calculation of a contribution to the relatedness metric of the target node is to be calculated;

calculating, for a combination of the node of interest and a third node associated with a path in the second set of paths, a second contribution to the relatedness metric based on the approximation calculation associated with the path in the second set of paths; and combining the first contribution and the second contribution to generate the relatedness metric.

13. The computer program product of claim 12, wherein the first set of paths are paths that have two or less edges that define the path and do not have a loop in the path, and wherein the second set of paths are paths that have more than two edges that define the path.

14. The computer program product of claim 12, wherein the computer readable program further causes the computing device to combine the first contribution and the second contribution to generate the relatedness metric at least by diluting the combination of the first contribution and the second contribution by an amount of edge sharing determined to be present in the paths of the first set of paths and paths of the second set of paths.

15. The computer program product of claim 10, wherein the computer readable program further causes the computing device to calculate the relatedness metric for the target node at least by:

determining, for each path from the node of interest to a plurality of other nodes in the blinking graph model, a degree of sharing of second edges along the path; and approximating the relatedness metric for each path based on blink rate values of the edges that are part of the path and the degree of sharing of the edges that are part of the path.

16. The computer program product of claim 10, wherein blink rate values associated with second edges of the blinking graph model are specified as either an individual blink rate values associated with a corresponding second edge such that the corresponding second edge has a blink rate value independent of other second, or as a joint function of a plurality of blink rate values associated with different types of evidence supporting a relationship modeled by the corresponding second edge such that the corresponding second edge has a blink rate value based on a combination of the plurality of blink rate values.

17. The computer program product of claim 10, wherein the cognitive operation is one of an operation to identify users of an online service that are determined to have similar attributes to a user of interest and present a listing of the identified users to the user of interest, or a question answering operation that generates an answer to an input natural language question.

18. An apparatus comprising:

a processor; and a memory coupled to the processor, wherein the memory comprises instructions which, when executed by the processor, cause the processor to:

receive an input graph comprising a plurality of first nodes, where subsets of first nodes in the plurality of first nodes are coupled to one another via one or more first edges and each first edge in the one or more first edges has an associated weight value;

generate a blinking graph model based on the graph, wherein the blinking graph model comprises blink rate values associated with second edges of the blinking graph model calculated based on weights of corresponding first edges in the input graph, wherein the blink rate value specifies a fraction of time a corresponding second edge is determined to be present in the blinking graph model;

receive a request for performance of a cognitive operation, wherein the request comprises an identification of a node of interest;

calculate a relatedness metric for a target node in the blinking graph model relative to the node of interest based on the blink rate values of the second edges, wherein the relatedness metric indicates a degree of relatedness of the target node to the node of interest, wherein the relatedness metric is calculated for the target node at least by calculating the relatedness metric for each path from the node of interest to a plurality of target nodes in the blinking graph model; and perform a cognitive operation based on the relatedness metric.

* * * * *